United States Patent [19]

Labeur

[11] Patent Number: 4,758,041
[45] Date of Patent: Jul. 19, 1988

[54] GLARE PROTECTION DEVICE FOR A VEHICLE

[75] Inventor: Lucas Labeur, Kessel-Lo, Netherlands

[73] Assignee: Ieper Industries NV, Ieper, Belgium

[21] Appl. No.: 26,744

[22] Filed: Mar. 17, 1987

[30] Foreign Application Priority Data

Mar. 18, 1986 [DE] Fed. Rep. of Germany ....... 3608927

[51] Int. Cl.⁴ ................................................. B60J 1/20
[52] U.S. Cl. ................................. 296/97 G; 160/274; 160/280; 160/287
[58] Field of Search ............... 296/97 R, 97 G, 97 C, 296/141, 143; 160/214 X, 275, 276, 280 X, 287 X

[56] References Cited

U.S. PATENT DOCUMENTS

| Re. 15,904 | 8/1924 | Hein | 296/141 |
|---|---|---|---|
| 928,865 | 7/1909 | Hoyt | 160/280 |
| 1,100,598 | 6/1914 | McLaren | 160/287 |
| 1,571,019 | 1/1926 | Lucas | 296/141 |
| 1,593,324 | 7/1926 | Anderson | 296/141 |
| 1,657,257 | 1/1928 | Hamp | 296/141 |
| 1,820,292 | 8/1931 | Wright | 160/90 |
| 2,574,729 | 11/1951 | Coffman | 296/97 R |
| 2,829,003 | 4/1958 | Moyes | 296/97 R |
| 2,963,316 | 12/1960 | Matthews | 296/97 R |
| 3,056,626 | 10/1962 | Browne | 296/97 G |
| 3,069,198 | 12/1962 | Winn | 296/97 G |
| 3,525,563 | 8/1970 | Loftin | 296/97 G |
| 4,497,515 | 2/1985 | Appelson | 296/141 |

FOREIGN PATENT DOCUMENTS

| 0093934 | 11/1933 | European Pat. Off. . |
|---|---|---|
| 0111270 | 6/1984 | European Pat. Off. . |
| 644744 | 4/1937 | Fed. Rep. of Germany . |
| 2445025 | 3/1975 | Fed. Rep. of Germany . |
| 2841218 | 7/1980 | Fed. Rep. of Germany . |
| 3226400 | 1/1984 | Fed. Rep. of Germany . |
| 3345503 | 6/1985 | Fed. Rep. of Germany . |
| 57-60908 | 4/1982 | Japan . |

Primary Examiner—Robert R. Song
Attorney, Agent, or Firm—Harness, Dickey & Pierce

[57] ABSTRACT

A glare protection device adapted for use with the rear window of passenger cars, which includes laterally separated flexible guide rails, a pull bar fixed to one edge of a sunscreen, the other edge of the sunscreen being fixed to a roll bar, a pair of hold bars slidably received in the end portions of the pull bar, each of the hold bars engaging respective one of the guide rails.

24 Claims, 5 Drawing Sheets

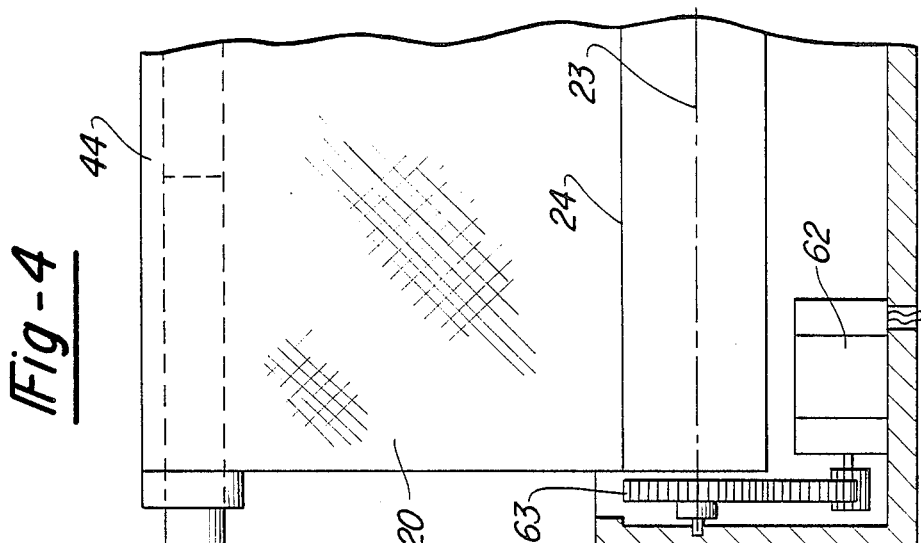
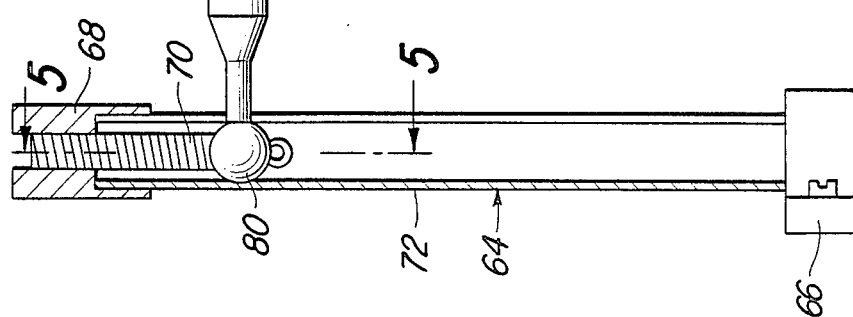
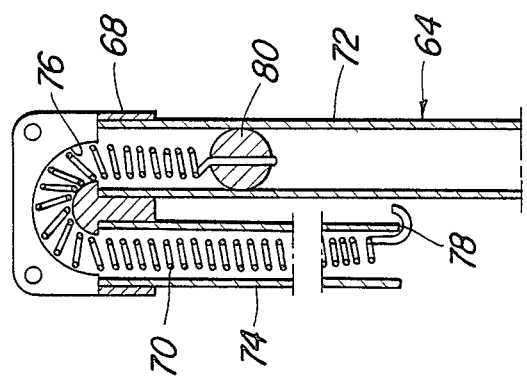
Fig-4
Fig-5

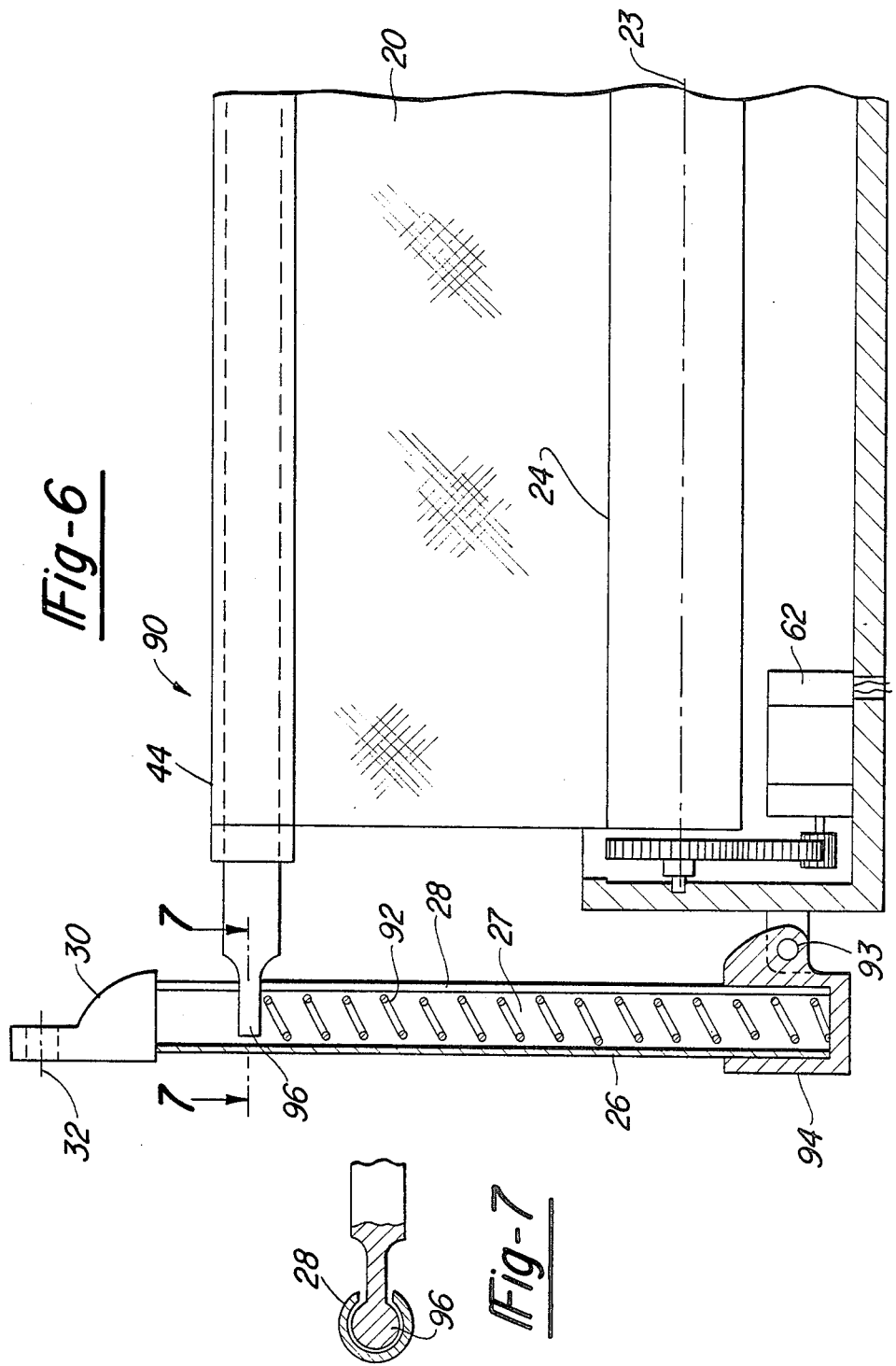

GLARE PROTECTION DEVICE FOR A VEHICLE

BACKGROUND OF THE INVENTION

This invention relates to a glare protection device, and particularly to one adapted to be mounted adjacent to a window of a vehicle. The glare protection device according to this invention is particularly adapted for use with the rear window (backlite) of passenger car motor vehicles.

Numerous designs of retractable glare protection devices are known according to the prior art which may be provided for the rear window of a passenger car. Sunscreen material typically in the form of a plastic film or mesh weave is provided which extends across the rear window and can be extended or retracted as desired, generally by remote control actuation. These devices reduce sun loading on the vehicle interior and provide glare protection for the occupants and driver.

Although glare protection devices according to the prior art operate satisfactorily, they are not easily adapted for use with different configurations of motor vehicles. Window shapes, sizes and configurations vary greatly from vehicle model to model; thus requiring specifically designed glare protection devices for each vehicle. The disadvantages of requiring the redesign or substantial reworking of these devices are obvious and lead to significant cost penalties. Even very minor changes in the width of the window or its angle may require a redesign or reworking of existing glare protection devices.

In view of the foregoing, there is a need to provide an improved glare protection device which may be easily adapted to encompass a wide range of car body configurations without substantial modification.

SUMMARY OF THE INVENTION

The glare protection device according to this invention provides the above-mentioned desired features. The devices described herein have a movable pull bar affixed to a free edge of the sunscreen material which is stored on a rotatable roll bar. Telescoping hold bars extend from the ends of the pull bar and have heads which travel along a pair of laterally separated guide rails which extend along the side edges of the associated window. The guide rails have a "C" shaped cross-sectional configuration and are made from a material which enables them to be deformable to a desired curvature. As the pull bar is moved away from the roll bar, the sunscreen material is unrolled to overlie the window, thus providing glare protection. As the pull bar is moved between its withdrawn and retracted positions, the hold bars are free to slide with respect to the pull bar in response to changes in the lateral distance between the guide bars. This design enables the angle between the guide rails and the roll bar to be varied, and the guide rails are plastically deformable. These features enable the glare protection device to the adapted for use with a wide variety of vehicle car configurations.

In accordance with a first embodiment of this invention, flexible spiral elements are installed within the guide rails and are rotatably driven by an electric motor or other suitable actuation means. Guide heads at the ends of the hold bars fit within the guide rails and are moved along the guide rails upon rotation of the spiral elements. A torsion spring acts on the roll bar to maintain the sunscreen material in a taut condition as it is being withdrawn and retracted. Preferably, the spiral elements are driven by gears, pinwheels or the like. One set of pinwheels is mounted to a case enclosing the roll bar and is actuated by an electric motor, and another set of pinwheels engage the first set and are coupled to the spiral elements. Hinges may be provided for mounting the guide rails to the case which permit a certain degree of angular adjustment between the guide bars and case, while enabling the pinwheels to properly engage. The top ends of the guide rails have an end cap enabling attachment to the vehicle.

In accordance with the second embodiment of this invention, the roll bar is driven by an actuation means to roll and unroll the sunscreen, and biasing means are provided which act on the pull bar to maintain the sunscreen in a taut condition throughout its movement. In accordance with this embodiment, such biasing is provided by a helical spring installed within the guide channel which is loaded in tension to pull on the guide heads. As a means of providing greater spring length, the guide rails can have a reversely bent configuration. For this embodiment, no direct connection is necessary between the guide rails and the roll case.

In accordance with a third embodiment of this invention, the roll bar is rotatably driven like the second embodiment. For this embodiment, however, the pull bar is biased by a spring installed within the guide channel which is loaded in tension to exert the desired biasing force.

The glare protection devices according to the present invention may be inexpensively manufactured and can be adapted to different vehicle models and modes of application. By driving the mechanism with an electric motor, remote actuation is provided. The glare protection devices can be used for wide variety of vehicles, for example in passenger cars, trucks, buses and rail cars. The devices can further be used for various applications such as side, front and rear windows.

Additional benefits and advantages of the present invention will become apparent to those skilled in the art to which this invention relates from the subsequent description of the preferred embodiments and the appended claims, taken in conjunction with the accompanying drawings.

DESCRIPTION OF THE DRAWINGS

FIG. 4 is a partial cross-sectional view similar to FIG. 2 showing the internal components of the embodiment shown in FIG. 3.

FIG. 5 is a cross-sectional view taken along lines 5—5 of FIG. 4.

FIG. 6 is a partial cross-sectional view of a glare protection device in accordance with a third embodiment of this invention in which the pull bar is biased by a coil spring loaded in compression.

FIG. 7 is a partial cross-sectional view taken along lines 7—7 of FIG. 6.

DETAILED DESCRIPTION OF THE INVENTION

Figure 1:
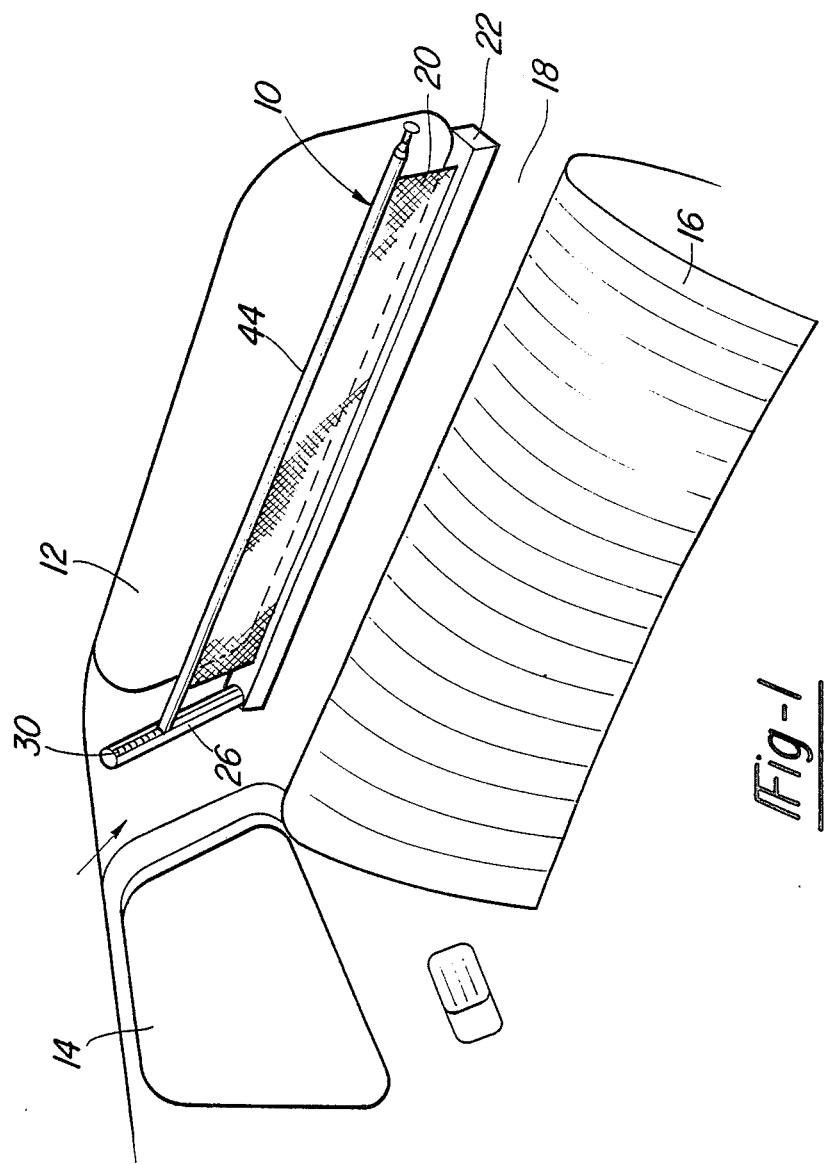
FIG. 1 is a pictorial view of a glare protection device according to a first embodiment of this invention shown installed along the backlite of a passenger car motor vehicle.

FIG. 1 illustrates a glare protection device in accordance with a first embodiment of this invention which is generally designated by reference number 10. Device 10 is shown installed within a vehicle body having rear window 12, side window 14, rear seat 16 and package shelf 18. Glare protection device 10 is shown installed in a manner in which sunscreen material 20 can be pulled upwardly to overlie rear window 12, or retracted to a storage condition inside case 22. FIG. 1 shows sunscreen 20 in a partially withdrawn position.

Figure 2:
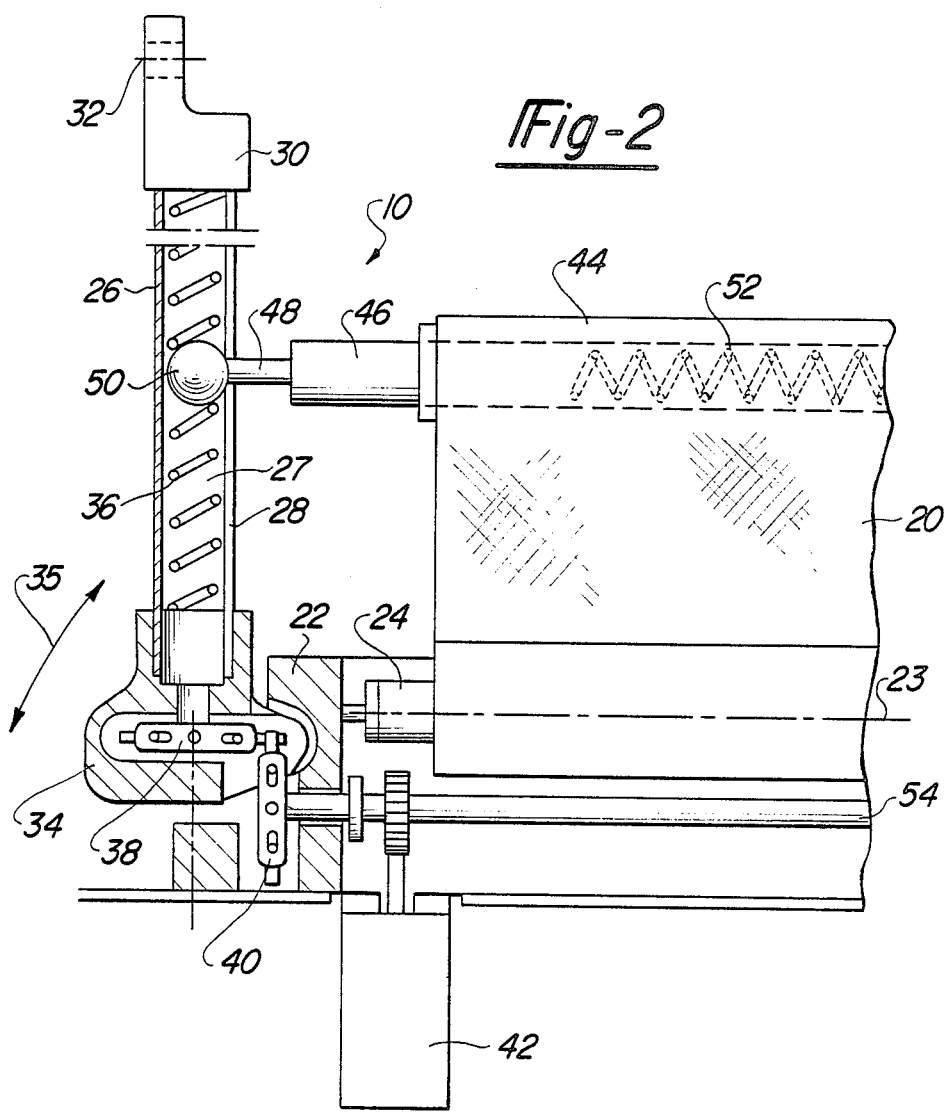
FIG. 2 is a partial cross-sectional view of the glare protection device shown in FIG. 1, particularly showing the internal components thereof.

Details of the components making up glare protection device 10 are best described with reference to FIG. 2. Case 22 provides a housing for the storage of sunscreen material 20. Roll bar 24 is mounted for rotation within case 22 about axis 23. A spring (not shown) rotatably biases roll bar 24 such that it exerts a tension force upon sunscreen material 20. Guide rails 26 are mounted at the lateral sides of the associated window (only one shown in FIG. 1) and are preferably made of a flexible material and have a "C" shaped cross section configuration, thus forming inside cavity 27 and longitudinally extending slot 28. Guide rail end caps 30 are provided with bores 32 enabling them to be conveniently attached at any particular point to the associated vehicle. Supports 34 enclose the lowermost ends of guide rails 26. Supports 34 may be affixed to case 22 by a hinge arrangement such that they are rotatable with respect to each other within a limited angular range, as indicated by the arcuate line 35.

Flexible spiral elements 36 are installed within guide rails 26 and are rotatably driven by pinwheels 38. Pinwheels 40 are driven by motor 42 and mesh with pinwheels 38 such that their rotation is transmitted to spiral elements 36. The configuration of pinwheels 38 and 40 is selected to enable the angle between guide rails 26 and case 22, as mentioned above, while enabling the driving coupling to be maintained. Shaft 54 transmits rotation for motor 42 to both pinwheels 40 (only one shown).

Pull bar 44 is attached to the edge of sunscreen material 20 opposite to the edge fastened to roll bar 24, and is a generally hollow member. A pair of hold bars 46 telescope inside pull bar 44 at both its ends and have extending ends formed by necks 48 and guide heads 50. Guide heads 50 are positioned within guide rail cavities 27, as shown in FIG. 2, such that necks 48 extends through slots 28. Spring 52 is installed within pull bar 44 to bias hold bars 46 outwardly. As is evident from FIG. 2, rotation of spiral element 36 driven by motor 42 causes head 48 to be displaced vertically upward or downward, as desired. The flexibility of spiral element 36 enables it to accommodate the curvature of guide rails 26.

Since guide rails 26 are made of a flexible material, they can be easily deflected to a desired curved configuration of the associated window. Moreover, the angle between guide rails 26 and case 22 can be varied within a limited angular range. These features, coupled with the telescoping movement of hold bars 46 within pull bar 44, enable a broad range of applications to be accommodated.

Figure 3:
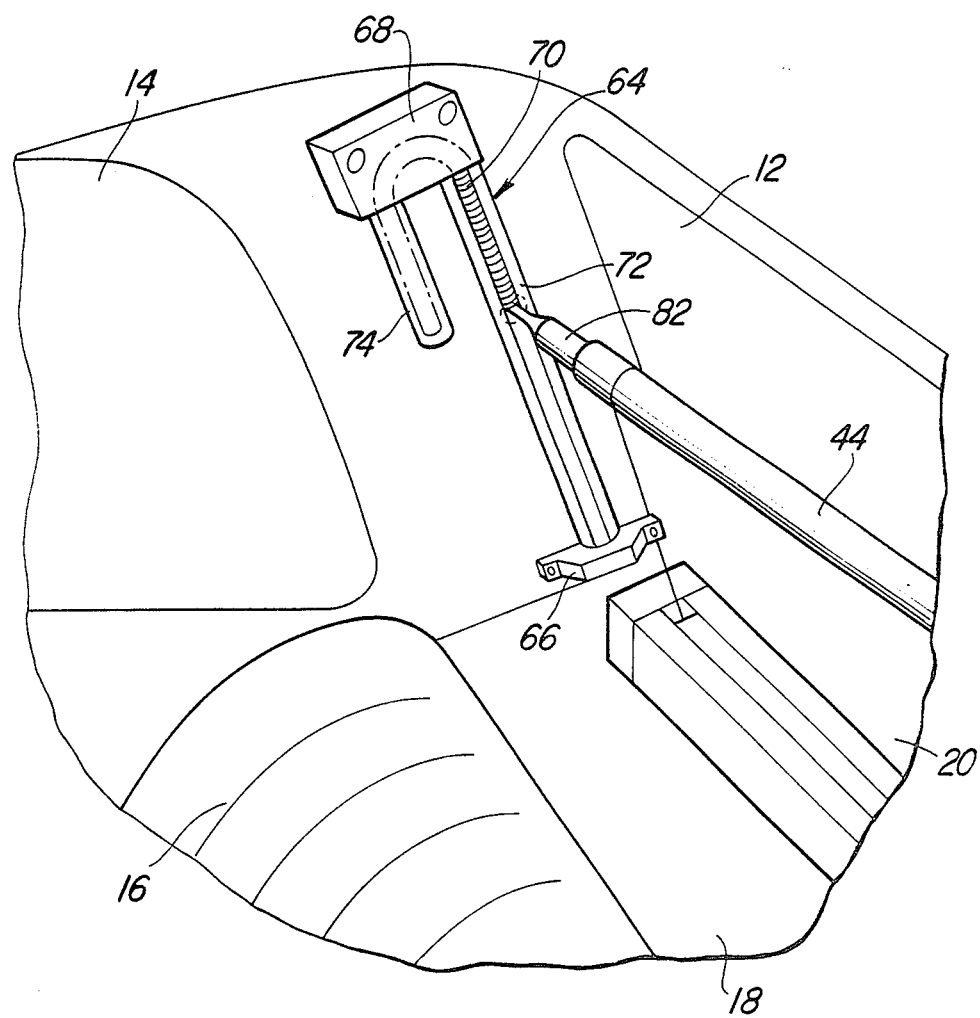
FIG. 3 is a pictorial view of a glare protection device in accordance with a second embodiment of this invention in which the pull bar is biased by a coil spring loaded in tension.

A second embodiment of a glare protection device according to this invention is shown in FIGS. 3 through 5 and is generally designated by reference number 60. Components of glare protection device 60 (and other embodiments described herein) which are identical to those described in connection with the first embodiment are identified by like reference numbers. Glare protection device 60 varies principally from the first embodiment in that roll bar 24 is driven for rotation by motor 62 through drive train 63, which is preferably positioned within case 22.

In accordance with this embodiment, a biasing force is applied onto hold bars 82 and pull bar 44 by coil springs 70 installed within guide rails assemblies 64. As best shown in FIG. 5, guide rail assembly 64 is comprised of a pair of channel portions 72 and 74, which are connected to end cap 68, which has an arcuate-shaped passage 76 communicating with the inside cavities of the two channel portions. End cap 66 enclosed the lower end of channel portion 72. Channel portion 72 has a "C" shaped configuration whereas channel portion 74 is tubular. Spring 70 has an end 78 which engages the distal end of channel portion 74 and has another end which engages guide head 80. Spring 70 provides a biasing force since it is constantly loaded in tension; thus, pulling guide head 80 and pull bar 44 in an upward direction. Guide rail assembly 64 is provided with the two channel portions 72 and 74 to provide sufficient length for the extension of spring 70. For this embodiment, guide rail assemblies 64 need not be directly adjacent to case 22, and accordingly, problems associated with transferring energy from the case to the guide rails are eliminated.

In operation of glare protection device 60, actuation of motor 62 causes sunscreen material 20 to be rolled and unrolled from case 22. Pull bar 44 is biased upwardly by the action of spring 70 which is constantly loaded in tension. As guide head 80 moves within channel portion 72, spring 70 is permitted to flow within passage 76.

A third embodiment of a glare protection device according to this invention is shown in FIG. 6 and is generally designated there by reference number 90. For this embodiment, roll bar 24 is driven by motor 62 as explained in connection with the second embodiment. The upward biasing force on pull bar 44 is, however, provided by spring 92 loaded in compression which is positioned between end cap 94 and guide head 96. Guide rail 26 is shown being pivotally connected to case 22 about pin 93 which can be provided if desired. Guide head 98 has a flattened configuration, unlike the guide heads shown in connection with the previous embodiments. Guide head 98 defines a circular profile when viewed as in FIG. 7, thus interlockingly within cavity 27 of guide rails 26.

In operation, glare protection device 90 operates like glare protection device 60, except that spring 92 is normally loaded in compression rather than tension.

While the above description constitutes the preferred embodiments of the present invention, it will be appreciated that the invention is susceptible to modification, variation and change without departing from the proper scope and fair meaning of the accompanying claims.

What is claimed is:

1. A glare protection device adapted to enable sunscreen material to be withdrawn to an extended position overlying a window or retracted to a stored condition comprising:

a roll bar affixed to one edge of said sunscreen material whereby said sunscreen material may be rolled onto said roll bar in said stored condition or unrolled from said roll bar to said extended position, a pull bar engaging the edge of said sunscreen material opposite said edge affixed to said roll bar, a pair of laterally separated guide rails, said guide rails being flexible enabling them to be deflected to a desired curved configuration, a pair of hold bars extending from the ends of said pull bar and slidably received by said pull bar, said hold bars having ends engagable with said guide rails such that as said pull bar is moved between said extended and said stored positions, said hold bars are permitted to slide with respect to said pull bar, thereby following the contours of said guide rails, and driving means for moving said sunscreen material between said extended and said stored conditions.

2. A glare protection device according to claim 1 wherein said guide rails have a generally "C" shaped cross-sectional configuration defining an inside cavity and a longitudinal slot.

3. A glare protection device according to claim 2 wherein said hold bars define a head which fits within said guide rail inside cavity and a neck which passes through said longitudinal slot.

4. A glare protection device according to claim 1 wherein said hold bars are telescopingly received within said pull bar.

5. A glare protection device according to claim 4 further comprising a spring installed within said pull bar which biases said hold bars outwardly from the ends of said pull bar.

6. A glare protection device according to claim 1 further comprising a case enclosing said roll bar and hinge means connecting said guide rails to said case enabling the angle therebetween to be varied.

7. A glare protection device according to claim 1 further comprising end caps affixed to said guide rails and having means to permit attachment to an associated structure.

8. A glare protection device according to claim 2 wherein:

said driving means comprises a flexible spiral element installed within said guide bar inside cavity and rotatable therein, said flexible spiral element engagable with said pull bar whereby rotation of said spiral element acts on said pull bar to move said pull bar longitudinally along said guide rails, and further comprising:

actuation means for causing rotation of said spiral elements, transmission means for coupling movement of said actuation means to said spiral element, and spring means acting on said roll bar for maintaining said sunscreen material in a taut condition when said pull bar is moved between said extended and said retracted positions.

9. A glare protection device according to claim 8 wherein said transmission means comprises a pair of pinwheels having extending posts which intermesh and permit the angle between said pinwheels to be varied.

10. A glare protection device according to claim 2 wherein said driving means comprises:

actuation means for rotatably driving said roll bar, and biasing means acting on said pull bar for exerting a biasing force on said pull bar for maintaining said sunscreen material in a taut condition.

11. A glare protection device according to claim 10 wherein said biasing means comprises an elongated spring within said guide rail inside cavity and being maintained in a compressed condition thereby exerting a biasing force on said hold bar.

12. A glare protection device according to claim 10 wherein said biasing means comprises a spring loaded within said guide rails inside cavity and being maintained in a tensioned condition.

13. A glare protection device according to claim 12 wherein said guide bar defines a reversely bent portion and wherein said spring is installed within said reversely bent portion.

14. A glare protection device adapted to enable sunscreen material to be withdrawn to an extended position overlying a window or retracted to a stored condition comprising:

a roll bar affixed to one edge of said sunscreen material whereby said sunscreen material may be rolled onto said roll bar in said stored condition or unrolled from said roll bar to said extended position, a pull bar engaging the edge of said sunscreen material opposite said edge affixed to said roll bar, a pair of laterally separated guide rails, said guide rails being flexible enabling them to be shaped to a desired configuration and defining an inside cavity and a longitudinal slot, a pair of hold bars extending from the ends of said pull bar and slidably received by said pull bar, said hold bar having ends engagable with said guide rails inside cavity whereby as said pull bars is moved between said extended and said stored positions, said hold bars are permitted to slide with respect to said pull bar, thereby following the contours of said guide rails, a flexible spiral element installed within said guide rail inside cavity and rotatable therein, said flexible spiral element engagable with said pull bar whereby rotation of said spiral element acts on said pull bar to move said pull bar longitudinally along said guide rails and further comprising:

actuation means for causing rotation of said spiral element, transmission means for coupling movement of said actuation means to said spiral element, and spring means acting on said roll bar for maintaining said sunscreen material in a taut condition when said pull bar is moved between said extended and said retracted positions.

15. A glare protection device according to claim 14 wherein said hold bars define a head which fits within said guide rail inside cavity and a neck which passes through said longitudinal slot.

16. A glare protection device according to claim 14 wherein said hold bars are telescoping received within said pull bar.

17. A glare protection device according to claim 16 further comprising a spring installed within said pull bar which biases said hold bars outwardly from the ends of said pull bar.

18. A glare protection device according to claim 14 further comprising a case enclosing said roll bar and hinge means connecting said guide rails to said case enabling the angle therebetween to be varied.

19. A glare protection device according to claim 14 further comprising end caps affixed to said guide rails and having means to permit attachment to an associated structure.

20. A glare protection device according to claim 14 wherein said transmission means comprises a pair of pinwheels having extending posts which intermesh and permit the angle between said pinwheels to be varied.

21. A glare protection device adapted to enable sunscreen material to be withdrawn to an extended position overlying a window or retracted to a stored condition comprising:
   a roll bar affixed to one edge of said sunscreen material whereby said sunscreen material may be rolled onto said roll bar in said stored condition or unrolled from said roll bar to said extended position,
   a pull bar engaging the edge of said sunscreen material opposite said edge affixed to said roll bar,
   a pair of laterally separated guide rails, said guide rails being flexible enabling them to be deflected to a desired curved configuration,
   a pair of hold bars extending from the ends of said pull bar and slidably received by said pull bar, said hold bars having ends engagable with guide rails such that as said pull bar is moved between said extended and said stored positions, said hold bars are permitted to slide with respect to said pull bar, thereby following the contours of said guide rails,
   actuation means rotatably driving said roll bar, and
   biasing means acting on said pull bar for exerting a biasing force on said pull bar for maintaining said sunscreen material in a taut condition.

22. A glare protection device according to claim 21 wherein said biasing means comprises an elongated spring within said guide rail inside cavity and being maintained in a compressed condition thereby exerting a biasing force on said hold bar.

23. A glare protection device according to claim 21 wherein said biasing means comprises a spring loaded within said guide rails inside cavity and being maintained in a tensioned condition.

24. A glare protection device according to claim 23 wherein said guide bar defines a reversely bent portion and wherein said spring is installed within said reversely bent portion.

* * * * *

UNITED STATES PATENT AND TRADEMARK OFFICE
CERTIFICATE OF CORRECTION

PATENT NO. :  4,758,041

DATED      :  July 19, 1988

INVENTOR(S) :  Lucas Labeur

It is certified that error appears in the above-identified patent and that said Letters Patent is hereby corrected as shown below:

On the Title Page under Foreign Patent Document:
 0093934 11/1933 European
 should be 11/1983

Column 1, line 58, "the" should be --be--.(2nd occurrence)

Column 7, line 18, claim 21, insert "said" after --with--.

Signed and Sealed this

Twenty-fifth Day of September, 1990

Attest:

HARRY F. MANBECK, JR.

*Attesting Officer*  *Commissioner of Patents and Trademarks*